United States Patent
Doll et al.

(10) Patent No.: US 6,994,475 B2
(45) Date of Patent: Feb. 7, 2006

(54) COATED ROLLING ELEMENT BEARING CAGES

(75) Inventors: Gary L. Doll, Jackson Township, OH (US); Ryan D. Evans, Jackson Township, OH (US); Carl R. Ribaudo, Jackson Township, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/797,342

(22) Filed: Mar. 10, 2004

(65) Prior Publication Data

US 2004/0179762 A1    Sep. 16, 2004

Related U.S. Application Data

(60) Provisional application No. 60/454,831, filed on Mar. 14, 2003.

(51) Int. Cl.
*F16C 19/06*    (2006.01)

(52) U.S. Cl. ..................... 384/492; 384/527
(58) Field of Classification Search ............... 384/492, 384/527, 565, 569, 572, 912, 907
See application file for complete search history.

(56) References Cited

U.S. PATENT DOCUMENTS

| 4,997,295 | A | 3/1991 | Kaisha |
|---|---|---|---|
| 5,067,826 | A | 11/1991 | Lemelson |
| 5,112,146 | A | 5/1992 | Stangeland |
| 5,165,804 | A | 11/1992 | Fisher et al. |
| 5,593,234 | A | 1/1997 | Liston |
| 6,340,245 | B1 * | 1/2002 | Horton et al. ............... 384/492 |
| 6,471,410 | B1 | 10/2002 | Jacobson et al. |
| 2003/0185478 | A1 * | 10/2003 | Doll et al. .................. 384/492 |

FOREIGN PATENT DOCUMENTS

| EP | 531082 | 3/1993 |
|---|---|---|
| GB | 1589041 | 5/1981 |
| JP | 3255224 | 11/1991 |
| JP | 9088975 | 3/1997 |
| WO | 9914512 | 3/1999 |

* cited by examiner

*Primary Examiner*—Lenard A. Footland
(74) *Attorney, Agent, or Firm*—Polster, Lieder, Woodruff & Lucchesi, L.C.

(57) ABSTRACT

A rolling element bearing comprises an inner ring (3) and an outer ring (2) each provided with a raceway (4, 5), said rings having land regions (10, 11) on opposite sides of their raceways, and a series of rolling elements (6) which are in rolling contact with the raceways and which are mutually spaced by a cage (7), said cage (7) engaging the land regions (10, 11) of said ring, said cage (7) being coated with a wear and friction reducing coating over its full surface.

17 Claims, 1 Drawing Sheet

COATED ROLLING ELEMENT BEARING CAGES

CROSS-REFERENCE TO RELATED APPLICATIONS

This application claims priority to provisional application Ser. No. 60/454,831, filed Mar. 14, 2003, and which is incorporated herein by reference.

STATEMENT REGARDING FEDERALLY SPONSORED RESEARCH OR DEVELOPMENT

Not Applicable.

BACKGROUND OF THE INVENTION

This invention is related to rolling element bearings, and in particular, to a coating for the cage of such a bearing.

Rolling element bearings comprise an inner ring and an outer ring each provided with a raceway. At least one of the rings has land regions on opposite sides of the respective raceway. A series of rolling elements which are in rolling contact with the raceways are maintained in a spaced-apart relationship by a cage. The cage engages the land regions of the ring.

It is a known practice to apply solid lubricant coatings such as silver to the cages in rolling element bearings for some applications. The silver coatings on the cages have two functions: (1) to form transfer films on the rolling elements and raceways and (2) to provide a barrier to adhesive wear between the machined steel cages and the land regions of the rings. A prevalent problem with this approach is that debris still present from the manufacturing process of the system, ingested into the system during operation, or evolved in the system through normal operation becomes trapped in the silver coating. Debris trapped in the silver coating is especially harmful when it is located on the regions of the cage that contact the land regions on the rings. The trapped debris behaves as grinding media and abrasively, or adhesively (depending upon the debris type) wears material from the land surfaces. When a critical amount of material has been removed from the land surface, the bearing fails catastrophically.

For example, EP 531082 discloses a bearing having rolling elements spaced by a cage which rides on the lands provided on one of the rings next to the raceway thereof. Such bearing has the advantage that the cage is guided by the ring in question, which improves the dynamic behavior of the ring and reduces whirl instability. According to EP 531082, a hard coating is applied to each land of the ring. According to U.S. Pat. No. 4,997,295, $WS_2$ and/or $MoS_2$ coatings are applied to the rolling elements and the inner and outer rings of rolling element bearings. According to U.S. Pat. No. 5,067,826, synthetic diamond coatings are applied to the rolling elements of bearings. Synthetic diamond is not useful as a coating for rolling element bearings because of its high deposition temperature, its low fracture toughness, and its inability to elastically accommodate contact stresses. U.S. Pat. No. 5,112,146 describes the use of a functionally, graded material system for the raceways of bearing rings. U.S. Pat. No. 5,593,234 describes the use of polycrystalline super-lattice coatings applied to the raceways of bearing rings. U.S. Pat. No. 6,471,410 describes the use of coatings on the land regions of the ring but not the cage thereof.

SUMMARY OF THE INVENTION

In accordance with the invention, briefly stated, a coating is applied to the cages, rather than the lands, bearing elements, or raceways. The coating of the present invention performs the desirable functions of the silver, without the ability to trap debris particles. The use of the coating of the present invention when applied to the bearing lands provides for a rolling element bearing in which the problem of the land wear caused by abrasive debris trapped in silver plated cages is eliminated.

An embodiment of such a coating system would comprise of multiple layers, for example:

1. An adhesion layer such as Cr, Ti, or Si that bonds well to the steel. This layer is typically on the order of less than about 1 micrometer thick.

2. A gradient layer that transitions between the adhesion layer and the primary coating layer. This layer is typically on the order of less than about 1 micrometer thick.

3. The primary coating layer that comprises a material that serves as a barrier to adhesive and abrasive wear. Typically, the thickness of this layer is less than about 5 microns thick. Examples of hard coatings that would be desirable for this application include
   a. amorphous hydrocarbons (also known as diamond-like carbons) that may or may not contain ternary elements such as Si or B or N,
   b. nanocomposites comprising nanometer sized metal carbides embedded in amorphous hydrocarbon matrices,
   c. boron carbide with and without nitrogen,
   d. tetrahedrally-bonded amorphous carbon.

4. A solid lubricant layer comprising $MoS_2$, $WS_2$, boron nitride, graphite, or PTFE for example. These materials may be combined or contain other elements such as Ti, Au, Ag, Cu, TiC, $TiB_2$, Ni, etc. that impart desirable properties such as insensitivity to humidity and thermal stability. Alternatively, this layer could comprise well-known metallic solid lubricants such as silver, gold, lead, indium, nickel, chromium, copper, or cadmium, but at much smaller thickness than the silver coatings that are currently being used. In this case, the thickness of this layer would be typically less than about 5 micrometers thick.

In the above embodiment, the coating system can be achieved by physical vapor deposition, chemical vapor deposition, or combinations thereof. Additionally, the deposition of the fourth layer could alternatively be achieved by non-vacuum processes such as high velocity impingement, electro- or electroless plating, sol-gel processing, burnished, or through surface treatment like ion implantation, laser cladding, or glazing. The thickness of the soft metal coatings in layer four would need to be less than the critical thickness in which debris particles can become embedded. The characteristic size of the debris particles will be application specific, and one schooled in the art would measure the debris size and adjust the coating thickness to be less than that size.

DETAILED DESCRIPTION OF THE PREFERRED INVENTION

Figure 1:
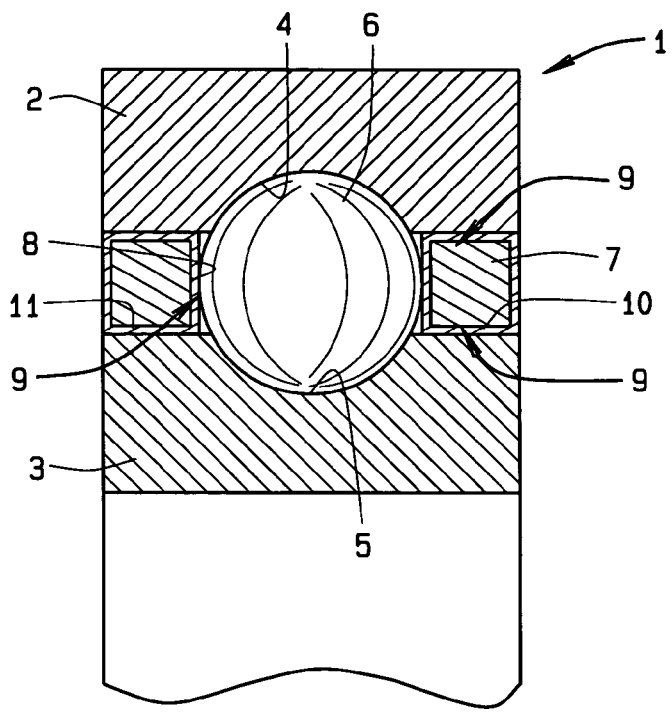
FIG. 1 is a cross-sectional view of a deep groove ball bearing having a coating of the present invention applied to the bearing cage.

The following detailed description illustrates the invention by way of example and not by way of limitation. This description will clearly enable one skilled in the art to make and use the invention, and describes what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 shows an axial cross-section through a deep groove ball bearing 1. The ball bearing 1 has an outer ring 2 and an inner ring 3, each of which are provided with a respective raceway 4, 5. The raceways 4, 5 are in rolling contact with a series of balls 6. These balls are maintained in a spaced-apart relationship by a cage 7, containing pockets 8 which hold the balls 6. The cage 7 is supported by the inner ring 3 in order to avoid swirl of the cage. The cage 7 has a coating system 9 applied over the full surface of the cage. The coating system 9 provides adhesive wear protection between the cage 7 and the balls 6, as well as the cage 7 and the lands 10, 11.

Figure 2:
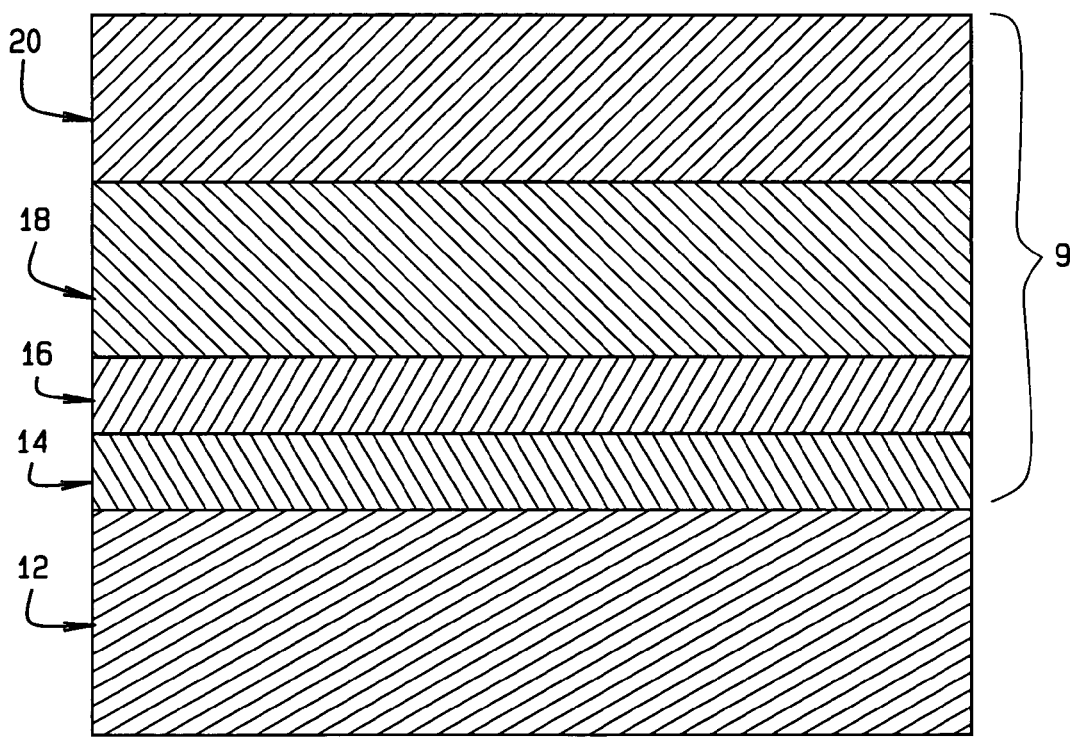
FIG. 2 is an enlarged cross-sectional view of the coating applied to a substrate (i.e., the bearing cage).

FIG. 2 shows a cross-section of the coating system. The steel substrate 12 (i.e., the surface of the cage 10) is in contact with an adhesion layer 14 that forms strong bonds with the substrate 12. A gradient layer 16 may be provided to form a transition from the adhesion layer 14 to a primary coating layer 18. A transfer film layer 20 is applied to the coating layer 18 to form a top layer of the coating system.

The adhesion layer 14 is preferably comprised of Cr, Ti, or Si, or other elemental metal that bonds well to the steel of the substrate. The layer 14 is typically on the order of less than about 1 micrometer thick.

The primary coating layer 18 comprises a material that serves as a barrier to adhesive and abrasive wear. Typically, the thickness of this layer is less than about 5 microns thick. Examples of hard coatings that would be desirable for this application include:
  a. amorphous hydrocarbons (also known as diamond-like carbons) that may or may not contain ternary elements such as Si or B or N;
  b. nanocomposites comprising nanometer sized metal carbides embedded in amorphous hydrocarbon matrices;
  c. boron carbide with or without ternary elements such as Si, metals, and nitrogen; and
  d. tetrahedrally-bonded amorphous carbon.

The gradient layer 16, if provided, typically has a thickness on the order of less than about 1 micrometer. The character of the gradient layer is specifically engineered depending upon the chemistry of the adhesion layer 14 and coating layer 18. For example, if the adhesion layer 14 is comprised of elemental Ti and the coating layer 18 is comprised of a Ti-containing amorphous carbon coating, the desirable gradient layer 16 would include a region over which the Ti composition decreased and the C composition increased until both compositions equaled the desired composition of the coating layer 18. In another example, if the adhesion layer 14 is comprised of Cr and the coating layer 18 is comprised of a W-containing amorphous carbon coating the gradient layer 16 could have several alternating layers of CrC and Cr. Alternatively, the gradient layer 16 could have decreasing Cr and increasing W and C compositions until the composition of the desired coating layer 18 was achieved.

The gradient layer 16 is formed as an independent step, after the adhesion layer 14 has been applied to the substrate 12, and before the primary coating layer 18 is applied. However, in certain circumstance, a gradient layer is not required. For example, if the adhesion layer 14 is comprised of chromium and the primary coating layer 18 is comprised of Cr-nitride, a gradient layer is not required. In those instances when the gradient layer is not required, the primary coating layer 18 would be applied directly over the adhesion layer 14.

The solid lubricant layer 20 comprises $MoS_2$, $WS_2$, boron nitride, graphite, or PTFE for example. These materials may be combined or contain other elements such as Ti, Au, Ag, Cu, TiC, $TiB_2$, Ni, etc. that impart desirable properties such as insensitivity to humidity and thermal stability. Alternatively, the top layer 20 could comprise well-known metallic solid lubricants such as silver, gold, lead, indium, nickel, chromium, copper, or cadmium, but at much smaller thickness than the silver coatings that are currently being used. In this case, the thickness of this layer would be typically less than about 5 microns thick. The maximum thickness of solid lubricant materials such as $MoS_2$, $WS_2$, boron nitride, graphite, or PTFE is determined by the dimensional tolerances of the specific bearing design.

It has been found that the fourth or top layer 20 of the coating system 9 can transfer to the balls 6, the lands 10, 11, and the raceways 4, 5.

The coating system 9 can be applied to the substrate 12 by physical vapor deposition, chemical vapor deposition, or combinations thereof. Additionally, the deposition of the fourth, top, layer 20 can alternatively be achieved by non-vacuum processes such as high velocity impingement, electro- or electroless plating, sol-gel processing, burnished, or through surface treatment like ion implantation, laser cladding, or glazing. The thickness of the soft metal coatings in the fourth or top layer 20 would need to be less than the critical thickness in which debris particles can become embedded. The characteristic size of the debris particles will be application specific, and one schooled in the art would measure the debris size and adjust the coating thickness to be less than that size.

As various changes could be made in the above constructions without departing from the scope of the invention, it is intended that all matter contained in the above description or shown in the accompanying drawings shall be interpreted as illustrative and not in a limiting sense. For example, although the coating 9 is described for use in conjunction with a deep groove ball bearing, the coating can also be used with other rolling element bearings. This example is merely illustrative.

We claim:

1. A coating for a rolling element bearing cage, the coating comprising:
   an adhesion layer which is applied to a surface of the bearing cage; said adhesion layer comprising an elemental metal which bonds to the bearing surface; said adhesion layer being chosen from the group consisting of Cr, Ti, and Si;
   a primary coating layer comprised of a material that serves as a barrier to adhesive and abrasive wear; the material of the primary coating layer being chosen from the group consisting of amorphous hydrocarbons, nanocomposites, boron carbide, and tetrahedrally-bonded amorphous carbon; and a solid lubricant layer; the solid lubricant layer is chosen from the group consisting of $MoS_2$, $WS_2$, boron nitride, graphite, PTFE, and metallic solid lubricants.

2. The coating of claim 1 wherein, if the solid lubricant layer is a metallic lubricant, the solid lubricant layer has a thickness of less than about 5 microns thick.

3. The coating of claim 1 wherein the adhesion layer has a thickness of less than about 1 micrometer thick.

4. The coating of claim 1 including a gradient layer which transitions between the adhesion layer and the primary coating layer.

5. The coating of claim 4 wherein the gradient layer is less than about 1 micrometer thick.

6. The coating of claim 1 wherein the primary coating layer is less than about 5 microns thick.

7. The coating of claim 1 wherein the metallic solid lubricant is chosen from the group consisting of silver, gold, lead, indium, nickel, chromium, copper, and cadmium.

8. The coating of claim 1 wherein the amorphous hydrocarbons contains ternary elements.

9. The coating of claim 8 wherein the ternary elements are chosen from the group consisting of Si, B, and N.

10. The coating of claim 1 wherein the nanocomposites comprise nanometer sized metal carbides embedded in amorphous hydrocarbon matrices.

11. The coating of claim 1 wherein the boron carbide includes nitrogen.

12. The coating of claim 1 wherein the material of the solid lubricant layer is combined with property imparting materials chosen from the group consisting of Ti, Au, Ag, Cu, TiC, $TiB_2$, Ni, and combinations thereof.

13. A roller element bearing comprising an outer ring and an inner ring, each of which are provided with a respective raceway; a plurality of rolling elements positioned between the raceways; a cage which maintains the rolling elements in a spaced-apart relationship; the improvement comprising a coating which is applied to the bearing cage; the coating comprising:

an adhesion layer which is applied to a surface of the bearing cage; said adhesion layer comprising an elemental metal chosen from the group consisting of Cr, Ti, and Si;

a primary coating layer comprised of a material that serves as a barrier to adhesive and abrasive wear; the primary coating layer being chosen from the group consisting of amorphous hydrocarbons, nanocomposites, boron carbide, and tetrahedrally-bonded amorphous carbon; and a solid lubricant layer; the solid lubricant layer being chosen from the group consisting of $MoS_2$, $WS_2$, boron nitride, graphite, PTFE, and metallic solid lubricants.

14. The rolling element bearing of claim 13 wherein adhesion layer has a thickness of less than about 1 micrometer thick; and the primary coating layer has a thickness of less than about 5 microns thick.

15. The rolling element bearing of claim 13 wherein the coating further comprises a gradient layer which transitions between the adhesion layer and the primary coating layer.

16. The rolling element bearing of claim 15 wherein the gradient layer is less than about 1 micrometer thick.

17. The roller element bearing of claim 13 wherein the coating is applied over the full surface of the cage.

* * * * *